United States Patent [19]

Zanon

[11] Patent Number: 5,078,334
[45] Date of Patent: Jan. 7, 1992

[54] FISHING REEL WITH REMOVABLE SPOOL AND REDUCTION OF FREE MOTION

[75] Inventor: Joseph Zanon, Bonneville, France

[73] Assignee: Mitchell Sports, societe anonyme, Cluses, France

[21] Appl. No.: 482,638

[22] Filed: Feb. 21, 1990

[30] Foreign Application Priority Data

Feb. 27, 1989 [FR] France ................. 89 02929

[51] Int. Cl.5 .......................................... A01K 89/00
[52] U.S. Cl. ................................. 242/322; 464/180
[58] Field of Search .............. 242/322, 321, 319, 311, 242/318, 245, 246; 464/180, 91; 384/125, 138, 215, 220, 243; 277/97

[56] References Cited

U.S. PATENT DOCUMENTS

| 2,119,244 | 5/1938 | Pranger | 277/97 |
|---|---|---|---|
| 2,865,662 | 12/1958 | Nurmse | 242/318 |
| 2,889,695 | 6/1959 | Moeller | 464/180 |
| 3,037,573 | 6/1962 | Larsen | 464/180 |
| 3,473,753 | 10/1969 | Hull | 242/240 |
| 3,481,554 | 12/1969 | Hull | 242/240 |
| 3,670,855 | 6/1972 | Lemery | 188/82.3 |
| 3,686,895 | 8/1972 | Easley | 464/180 |
| 3,693,901 | 9/1972 | Lilland et al. | 242/318 |
| 3,726,109 | 4/1973 | Mortensen | 464/91 |
| 3,799,630 | 3/1974 | Chisholm | 384/125 |
| 3,987,976 | 10/1976 | Lilland |  |

FOREIGN PATENT DOCUMENTS 336639 9/1954 Sweden ................. 242/318

OTHER PUBLICATIONS

Seals and Sealing Handbook, Gulf Publishing Co., 1981, p. 231.

Primary Examiner—Daniel P. Stodola
Assistant Examiner—John Q. Nguyen
Attorney, Agent, or Firm—Ratner & Prestia

[57] ABSTRACT

A fishing reel with removable spool and reduction of the free motion is disclosed, comprising a removable spool which can be fitted on a shaft integral with the reel body. A main annular seal made from a resilient material is inserted between the spool bore and the spool shaft. The seal is compressed axially and radially between corresponding surfaces of the spool and the shaft. A secondary seal is compressed radially between the spool and the shaft. The seals reduce the free motion between the spool and the shaft.

12 Claims, 2 Drawing Sheets

FISHING REEL WITH REMOVABLE SPOOL AND REDUCTION OF FREE MOTION

BACKGROUND OF THE INVENTION

The present invention relates to fishing reels having a removable spool with rear brake.

Such reels, described for example in the document CH-A-336 639, comprise a reel body which can be fitted on a fishing rod and an internal holding device for holding a spool support shaft in a fixed axial direction. The internal holding device further provides axial translation drive and rotational braking of the spool support shaft. The spool support shaft comprises an external portion projecting from the reel body and shaped so as to receive and retain a removable spool. A removable spool, comprising an axial bore, fits on to the external spool shaft portion and comprises a locking and unlocking device which can be operated by the user for locking the reel axially and freeing it with respect to the spool shaft when he wishes.

Removable spools of such known reels are generally formed by molding. The result is that the annular axial bore of the spool has a relief angle profile permitting removal from the mold and is generally fitted on a cylindrical shaft.

Furthermore, molding techniques lead to relatively substantial variations in the dimensions of the axial bore of the spool between the different series of molded spools.

The above considerations lead, in known reels, to providing a not inconsiderable radial free motion between the shaft and the spool. The same goes for the axial free motion which must be left between the shaft and the spool by the locking device.

The inventors have discovered, in known reels, the existence of random defects of winding of the line on the spool, during use of the reel. Surprisingly, the inventors then discovered that quasi suppression of the axial play and of the radial play of the spool with respect to the spool shaft using parts machined with small tolerances, very substantially reduces the random defects of winding of the line on the spool.

The invention uses this observation and proposes a new reel structure having means for reducing or quasi suppressing the free motion existing between a reel spool and its spool shaft.

Another object of the invention is to provide particularly simple and inexpensive means for suppressing this free motion, the means in particular suppressing simultaneously the axial play and the radial play.

According to another object, the means of the invention can be adapted with quite minor modifications to known reel structures.

Another advantage of the invention is to permit axial play take-up means to be adjustably fitted for accommodating the relatively wide variations of axial dimension of the molded reel portions.

SUMMARY OF THE INVENTION

To attain these objects as well as others, the reel of the present invention comprises the main structural elements of known reels having a removable spool, namely:
- a reel body which can be fitted on a fishing rod,
- a spool support shaft, a portion of which is inside the reel body and is held by a holding device providing axial translation and rotational braking thereof, and an external portion of which is formed so as to receive and retain a removable spool,
- a removable spool, comprising an axial bore fitting on the external spool shaft portion, and comprising a locking and unlocking device which can be operated by the user for axially locking the spool and freeing it with respect to the spool shaft when he wishes.

According to the invention, the reduction of free motion is obtained by the fact that:
- at least one main annular seal made from a plastic material is inserted between the spool bore and the spool shaft,
- the main annular seal is compressed axially between respective bearing surfaces of the bore and of the shaft, the locking device holding the spool axially on the shaft against the axial thrust of the main annular seal,
- simultaneously, the main annular seal is compressed radially between respective annular surfaces of the bore and of the shaft, whose respective radii have a difference less than the thickness of the main annular seal.

In one embodiment, a better reduction of radial play and a reduction of the spool oscillations about the shaft may be obtained by providing a second annular seal inserted between the spool shaft and the spool bore, in a zone offset axially with respect to the first annular seal, the second annular seal being compressed radially between the spool bore and the spool shaft.

In an advantageous embodiment, a washer is inserted between the main annular seal and the axial bearing surface of the spool shaft. It is then possible to insert washers of different thicknesses for accommodating different spool bore lengths, and thus taking up length variations.

BRIEF DESCRIPTION OF THE DRAWINGS

Other objects, features and advantages of the present invention will be clear from the following description of particular embodiments, with reference to the accompanying figures in which.

DESCRIPTION OF THE PREFERRED EMBODIMENTS

Figure 1:
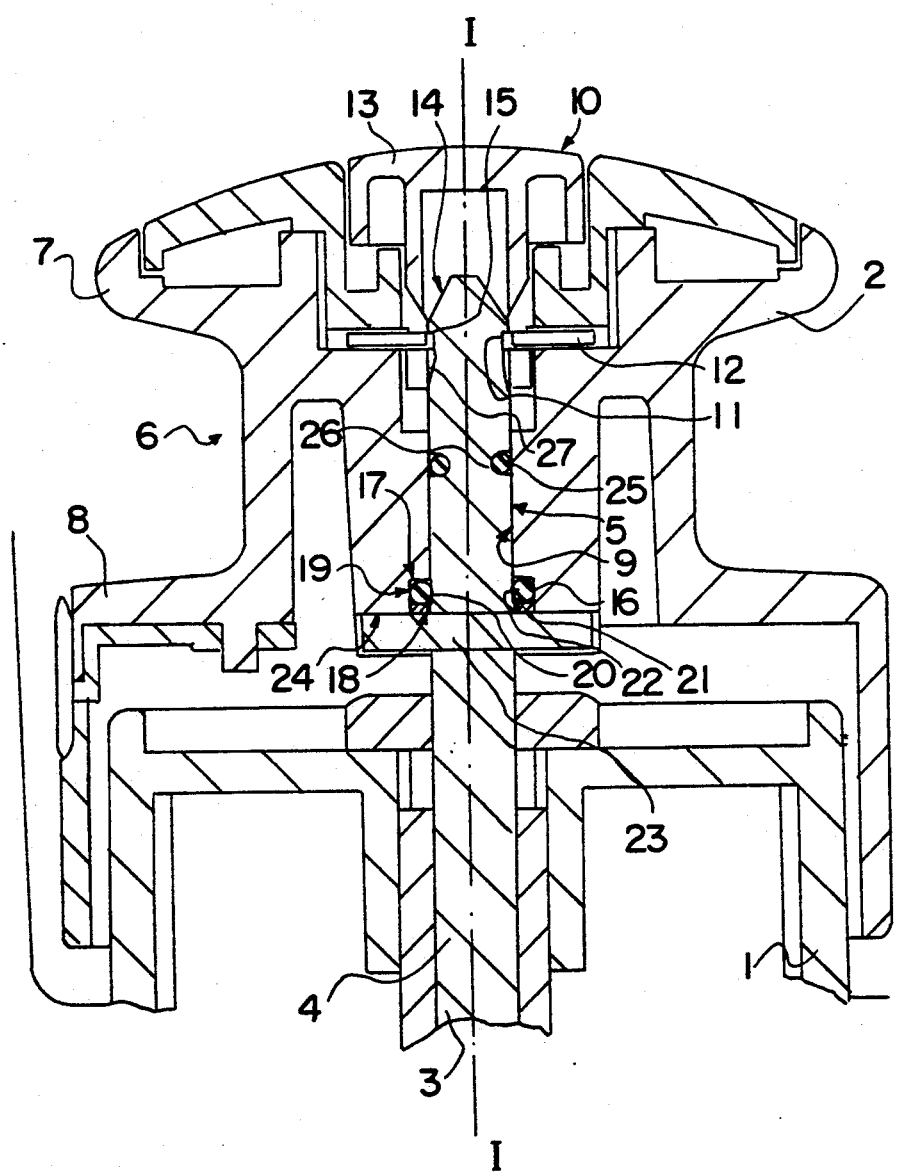
FIG. 1 is a partial longitudinal sectional view of a reel according to the invention, showing the connection between the spool shaft and the spool.

The reel shown in FIG. 1 comprises a reel body, shown partially, which is generally fitted on a fishing rod in an orientation such that the longitudinal axis I—I of the reel is substantially parallel to the fishing rod axis. The removable spool 2 can be fitted on the reel body 1, on which it is held by a spool shaft 3.

The spool shaft 3 comprises an internal portion 4 penetrating into the reel body 1, and held in axial position along the axis I—I of the reel body on said body 1 by a holding device not shown in the figures. The holding device, of a type well known in the technique and described for example in the document EP-A-0 157 714, holds shaft 3, drives it in axial translation and brakes it in rotation. A rear brake, not shown, which can be operated by the user, adjusts the braking force applied to shaft 3 for controlling the rotation of spool 2 with respect to the reel body 1. Shaft 3 comprises an external portion 5, projecting from the reel body 1 and conformed so as to receive and retain the removable spool 2.

The removable spool 2 comprises an external peripheral annular housing 6 for receiving the fishing line, reeled in the housing 6 by the action of a line winder-in, not shown in the figures. Housing 6 is defined by a front radial flange 7 and a rear radial flange 8. The removable spool 2 comprises an axial bore 9 shaped so as to fit on the external portion 5 of the spool shaft 3. A sufficient play must be left between the axial bore g and the external portion 5 of shaft 3, for the free axial translational movement of spool 2 on shaft 3.

A locking device 10 is provided on the spool, for locking and unlocking the spool 2 with respect to shaft 3. For example, the locking device 10 may be of a known type, such as shown in FIG. 1, in which a front annular groove is formed in the vicinity of the front end of shaft 3, said groove permitting engagement of a spring 12 fast with spool 2; a pusher 13, accessible from the front face of the front radial flange 7 of the spool, when it is pressed in, moves spring 12 aside and frees it from the annular groove 11. The front end of shaft 3 comprises a tapered portion 14. At the time of engagement of spool 2 on shaft 3, the tapered portion 14 moves spring 12 aside, which then snap-fits into the annular groove 11 and prevents the spool 2 from being removed. The spool is then in the locked position, shown in FIG. 1, in which spring 12 bears axially against the front wall 15 of the annular groove 11, so that spool 2 is urged in the direction of the reel body 1. Spool 2 is unlocked by pressing in pusher 13, which then moves spring 12 out of the annular groove 11, to escape from the front radial wall 15 of the annular groove 11.

In the embodiment shown, a main annular seal 16, made from a resilient material, is inserted between the axial spool bore 9 of spool 2 and the spool shaft 3. The main annular seal 16 is compressed axially between an axial bearing surface 17 of spool 2 and an axial bearing surface 18 of shaft 3. Similarly, the main annular seal 16 is compressed radially between an annular surface 19 of the spool and an annular surface 20 of the shaft. In the embodiment shown in the figures, the annular surfaces 19 and 20 are cylindrical surfaces coaxial with the longitudinal axis I—I of the reel, whereas the axial bearing surfaces 17 and 18 are flat surfaces perpendicular to the longitudinal axis I—I of the reel. A flat washer 21 is inserted between the main annular seal 16 and the axial shaft bearing surface 18. The main annular seal 16 is carried by shaft 3 and is partially embedded in a shallow annular groove 22. The depth of groove 22 may be substantially equal to a quarter of the thickness of seal 16. Groove 22 is formed in the vicinity of the base of the external portion 5 of shaft 3. The axial shaft bearing surface 18 may be formed by the front face of a radial extension of the shaft, for example by the front face of a pin 23 fast with the shaft and securing the spool 2 on shaft 3. The axial bore 9 comprises a front portion, of a relatively reduced diameter, connected to a rear portion of larger diameter by the axial bearing surface 17, the rear portion forming the annular spool surface 19 and being connected to the rear face 24 of the spool.

Figure 2:
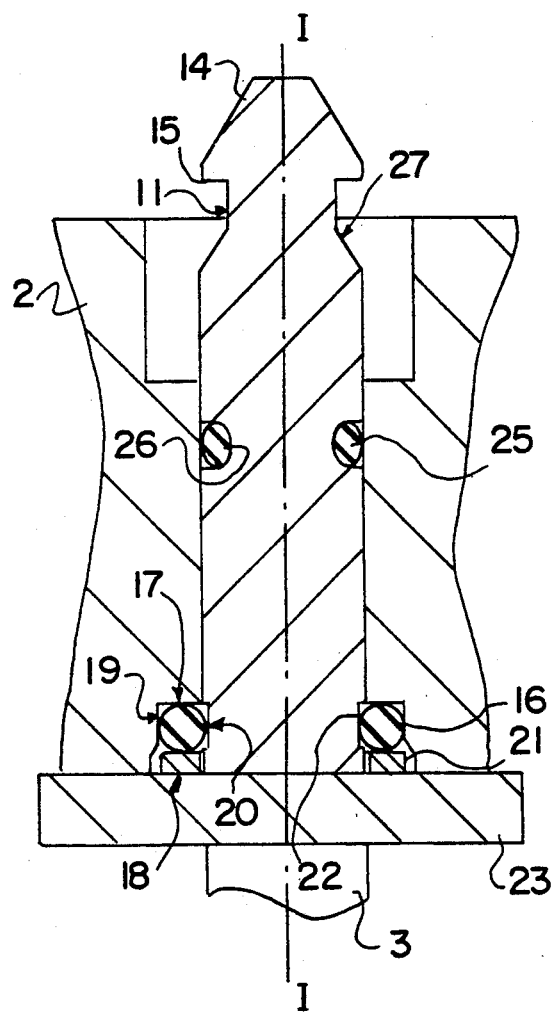
FIG. 2 is a longitudinal sectional view on a larger scale of the connection between the spool and the spool shaft.

A secondary annular seal 25, made from a resilient material, is fitted in the secondary annular groove 26 of the shaft, formed in a position axially removed from the first groove 22 and the main seal 16. For example, the secondary groove 26 may be formed in the vicinity of the front end of the narrowed portion of the axial bore 9, as shown in the figures. The thickness of the secondary seal 25 and the dimension of the secondary groove 26 are chosen so that, when spool 2 is fitted on shaft 3, the secondary seal 25 is compressed radially between bore 9 and shaft 3. The secondary groove 26 may for example have a rounded section, as shown in FIG. 2, so as to centre the secondary seal 25. Preferably, the rear wall 27 of the annular groove 11 at the front end of shaft 3 is tapered, as shown in the figures.

In a practical embodiment, the annular seals may advantageously be formed of elastomer O-seals.

The operation of the device is the following: when seals 16 and 25 are assembled on shaft 3, the secondary seal 25 may be first of all engaged by sliding it over the tapered portion 14 then over the tapered rear wall 27, until it reaches the secondary groove 26. Then the main annular seal 16 is fitted, in the same way, so as to bring it into groove 22, after insertion of a washer 21. The removable spool may then be engaged on the end of shaft 3. At the end of engagement, spool 2 is slightly compressed in the direction of reel body 1 so as to compress the main seal 16 axially and snap-fit spring 12 behind the front wall 15 of the front groove 11. In this position of use, spool 2 is locked on shaft 3 and the main annular seal 16 is compressed axially between the spool and shaft bearing surfaces 17 and 18, and is compressed radially between the annular surfaces 19 and 20 of the spool and the shaft. The secondary seal 25 is compressed radially between the axial bore 9 and the secondary groove 26 of shaft 3. The main seal 16 reduces the axial free motion between spool 2 and shaft 3 and participates in reducing the radial play between spool 2 and shaft 3. The reduction of the axial play between spool 2 and shaft 3 is completed by the secondary seal 25.

Assuming a variation of the lengths of the bores of spool 2, in a large scale production of such reels, it is possible to compensate for the variations by fitting washers 21 of different thicknesses and adapted as a function of the dimensions of the bore. Thus, by choosing a washer 21 of appropriate dimensions, suitable axial compression of the main seal 16 may be obtained when spool 2 is fitted on shaft 3.

When spool 2 is removed from shaft 3, by pressing the pusher 13, the main seal 16 is held by the rear groove 22 and remains on shaft 3, whereas the secondary seal 25 remains in the secondary groove 26 of shaft 3.

Other embodiments are also possible without departing from the scope of the present invention. For example, one variant may consist in omitting the secondary seal 25, taking advantage of the fact that the axial bore 9, with a generally relief angle profile, has a more reduced diameter in the vicinity of its front end, so that the free motion between the bore and the shaft 3 is generally smaller in this zone.

Another variant may consist in inserting the main seal 16 not in a groove 22 of shaft 3 but in an appropriate shallow groove of the bore 9 of spool 2, so that the main seal 16 remains fast with the spool. In any case, in such an embodiment, the main seal 16 must be compressed axially and radially simultaneously when spool 2 is in position on shaft 3.

Similarly, the secondary seal 25 may be housed not in a secondary groove 26 in shaft 3 but in a secondary groove in the bore of spool 2.

The present invention is not limited to the embodiments which have been explicitly described, but includes the different variants and generalizations thereof contained within the scope of the following claims.

What is claimed is:

1. Fishing reel with a removable spool, comprising:
   a reel body which can be fitted on a fishing rod,
   a spool support shaft, a portion of which is inside the reel body and is held by a holding device providing axial translation and rotational braking thereof, and an external portion of which is formed so as to receive and retain the removable spool,
   the removable spool comprising an axial bore fitting on the external spool shaft portion and a locking and unlocking device which can be operated by the user for axially locking the spool and selectively freeing it with respect to the spool shaft, wherein
   at least one main annular damper made from a resilient material is inserted between the spool bore and the spool shaft,
   the main annular damper is compressed axially between respective axial bearing surfaces of the spool and of the shaft, the locking device holding the spool axially on the shaft against the axial thrust of the main annular damper, wherein the main annular damper suppresses axial movement between the spool and the shaft,
   simultaneously, the main annular damper is compressed radially between respective annular surfaces of the bore and of the shaft, whose respective radii have a difference less than the thickness of the main annular damper, wherein the main annular damper suppresses radial movement between the spool and the shaft.

2. The reel as claimed in claim 1, further comprising a second annular damper which is inserted between the spool shaft and the spool bore, disposed in a zone offset axially with respect to the main annular damper, and compressed radially between the spool bore and the spool shaft.

3. The reel as claimed in claim 1, wherein said main annular damper is disposed in the vicinity of the base of the external portion of the shaft.

4. The reel as claimed in claim 2, wherein said secondary damper is housed in a annular groove of the shaft.

5. The reel as claimed in claim 2, wherein said secondary damper is housed in an annular groove of the spool bore.

6. The reel as claimed in claim 1, wherein the main annular damper is housed in a shallow annular groove of the shaft.

7. The reel as claimed in claim 1, wherein said main annular damper is housed in a shallow annular groove of the bore of the spool.

8. The reel as claimed in claim 1 wherein said main annular damper is compressed axially between an axial bearing surface of the spool formed of a substantially flat surface and perpendicular to the longitudinal axis of the reel and an axial bearing surface of the shaft formed of the front face of a radial extension of the shaft.

9. The reel as claimed in claim 8, wherein the radial extension of the shaft is a transverse pin providing simultaneous interlocking of the shaft and the spool for rotation.

10. The reel as claimed in claim 1, further comprising a washer inserted between the main annular damper and the axial shaft bearing surface, for adjusting the axial compression of the main annular damper.

11. The reel as claimed in claim 2, wherein the annular dampers are O-rings.

12. The reel as claimed in claim 1, wherein the front end of the shaft comprises a front annular groove permitting snap-fitting of the locking device for locking the spool, and the rear face of said front annular groove is tapered for passing the annular dampers.

* * * * *

UNITED STATES PATENT AND TRADEMARK OFFICE
CERTIFICATE OF CORRECTION

PATENT NO. : 5,078,334
DATED : January 7, 1992
INVENTOR(S) : Joseph Zanon

It is certified that error appears in the above-indentified patent and that said Letters Patent is hereby corrected as shown below:

Column 5, Line 38:

spool shaft and the spool bore said second damper being disposed in a zone offset Column 6, Line 5:

the shaft.

Column 6, Lines 6-8:

4. The reel as claimed in claim 2, wherein said second damper is housed in an annular groove in the shaft.

Signed and Sealed this

Twenty-sixth Day of October, 1993

*Attest:*

BRUCE LEHMAN

*Attesting Officer*     Commissioner of Patents and Trademarks